Aug. 13, 1929.  E. GRUBER  1,724,279
MERCURY TRAP
Filed Aug. 15, 1927

Inventor
Edward Gruber
By Brockett & Hyde
Attorneys

Patented Aug. 13, 1929.

1,724,279

UNITED STATES PATENT OFFICE.

EDWARD GRUBER, OF CLEVELAND, OHIO, ASSIGNOR TO EDMUND E. ALLYNE, OF CLEVELAND, OHIO.

MERCURY TRAP.

Application filed August 15, 1927. Serial No. 213,153.

The invention here disclosed relates to traps for use in connection with refrigerating apparatus generally and particularly to apparatus utilizing the absorption principle.

In absorption refrigeration apparatus it is necessary in many circuits to employ means for directing the flow of the gas in certain different directions and to accomplish this by means which cannot be affected by any of the functions and uses of the apparatus or the materials used in such apparatus. As a rule an absorption apparatus is fully charged and sealed at the factory or factory station and shipped out ready for starting and use. This entails the use of devices and materials which will readily lend themselves to such a course. In shipment the apparatus is turned in all directions and assumes various positions when many devices normally capable of operation in such a system are rendered ineffective and useless.

To overcome these difficulties mercury seals or traps have been provided which effectively provide free flow in the desired direction and obstruct flow in the undesired direction and which may be turned or moved into different positions without affecting their operation or efficiency.

In view of the foregoing, the present invention aims to still further overcome some of these difficulties and increase the operation and efficiency of such a trap by improving its structure so that it further prevents the loss of the mercury or the sealing liquid when the apparatus is tilted or turned into any position and especially when it is turned out of the position which it normally assumes in operation.

The features of invention will be apparent from the following description, drawings and claims.

Figure 1:
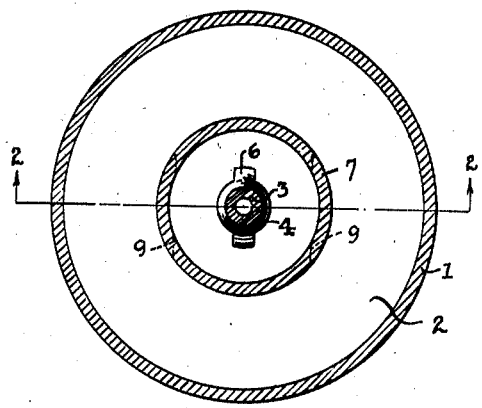
Figure 2:
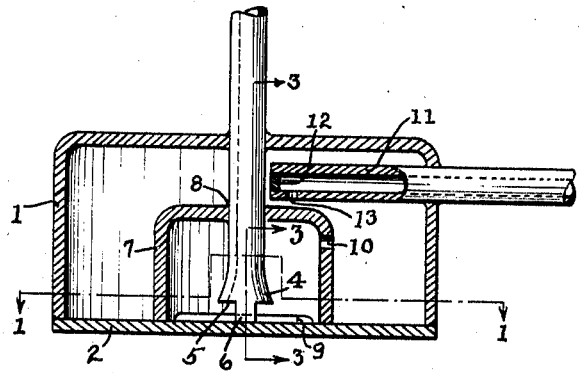
Figure 3:
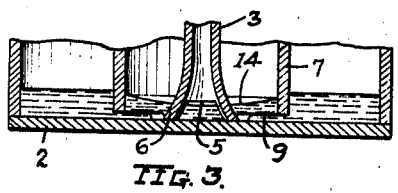
Figure 4:
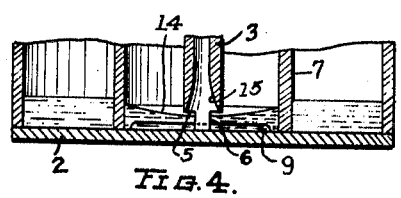

Referring to the drawings, Fig. 1 is a horizontal section upon the line 1—1, Fig. 2; Fig. 2 is a vertical section upon the line 2—2, Fig. 1; Fig. 3 is a sectional view on the line 3—3, Fig. 2, with parts broken away; and Fig. 4 is a similar view showing a modified form.

In the embodiment shown, 1 represents a main outer casing of inverted cup shaped form provided with a lower or bottom cover plate 2. The casing is preferably circular in horizontal cross section as shown, and at its center it receives a pipe or tube 3 which extends well down into the trap near the bottom where its lower end is flared out at 4 in inverted funnel shape. The lower edge 5 of this funnel shaped portion is spaced from the bottom of the receptacle a suitable distance to permit the passage of sealing liquid from the trap into this tube. If desired, the tube may be supported by suitable extensions or legs 6 formed as continuations of the funnel shaped portion and resting upon the cover 2.

Within the main casing 1 is a similar smaller inner casing 7 welded or otherwise sealed at 8 to the tube 3 and having its skirt extending down into engagement with the plate 2. Suitable skirt openings 9 are provided at the junction of the skirt and the plate 2 to provide flow of the sealing liquid from the outer to the inner casing. Two of these openings are shown in Figs. 2, 3 and 4. This inner casing is also provided with a suitable vent 10 at a point near its top, as shown. Projecting laterally into the main casing 1 at a point well above the sealing liquid, in the entire trap, is a gas pipe or tube 11 which projects radially toward the center and is sealed at its inner end by a plug 12, an opening 13 being provided in its bottom immediately above the top of the inner casing, as shown.

Before the trap thus described is completely assembled, a charge of mercury or other sealing liquid is placed in it and the level of this liquid is above the edge 5, the height depending upon the sealing capacity of the trap. The trap normally stands in the position shown in Fig. 2, when the mercury will settle to the bottom above the plate 2, will pass into the openings 9 and find its level within the inner casing 7 and will form a seal for the funnel shaped portion 4.

In use, it is necessary for the gas entering the pipe 11 to build up a pressure in the trap corresponding to the column of mercury or other sealing liquid in the pipe 3, which should be extended upwardly to a sufficient height to receive proper liquid column for the pressure desired. It is obvious that free flow of gas may take place through the pipe 3 for the reason that there is only a small column of the sealing liquid in the pipe 3 and this will readily be blown out by the gas and will not create any great disturbance in the trap and it is thought that the surface of the liquid in the inner casing at such a time assumes something of the form or shape indicated by the curved line 14. In the modification shown in Fig. 4, the lower end of the pipe 3 in place of being bulged out to form a funnel or the like, is internally reamed to provide a flaring mouth indicated at 15.

By providing the tube 3 with a mouth of either the two types shown and described, the trap may be tilted with less danger of the sealing liquid passing out through the pipe 3, since even any small particle of the sealing liquid at the mouth of this pipe will tend to drain back into the trap as it is turned. It must be borne in mind that these traps are of vital importance in apparatus of this kind and the discharge of a very small particle or quantity of the sealing liquid into the rest of the apparatus may upset its proper functioning.

What I claim is:

1. A device for controlling the flow of refrigerant in refrigerating systems, comprising a casing having a chamber containing a heavy sealing liquid, an exit conduit entering said chamber and provided with an opening spaced in all directions from the casing walls, and an inlet conduit entering the casing from above and having a portion extending downwardly therein and opening below the level of the sealing liquid and at its lower end having the inner surface of its wall flaring downwardly in all directions in trumpet form, thereby to prevent escape of sealing liquid into the inlet conduit upon inversion of the device from its normal upright position.

2. A device for controlling the flow of refrigerant in refrigerating systems, comprising a casing provided with spaced inner and outer walls forming two chambers, and containing a sealing liquid, the inner wall being provided with openings affording communication between the two chambers both below and above the normal level of the surface of the sealing liquid, an exit conduit entering the outer chamber and provided with an opening spaced in all directions from the casing walls, and an inlet conduit entering the casing from above and extending downwardly through both walls and into the inner chamber and there having an opening below the level of the sealing liquid, said inlet conduit at its lower end within the inner chamber having the inner surface of its wall flared downwardly in all directions in trumpet form, thereby to prevent escape of sealing liquid into the inlet conduit upon inversion of the device from its normal upright position.

In testimony whereof I hereby affix my signature.

EDWARD GRUBER.